Feb. 9, 1943.  A. P. SULLIVAN  2,310,472
GAS ANALYZER
Filed Oct. 12, 1940

INVENTOR
ALAN P. SULLIVAN
BY Edmund F. Borden
ATTORNEY

Patented Feb. 9, 1943

2,310,472

UNITED STATES PATENT OFFICE 2,310,472

GAS ANALYZER

Alan P. Sullivan, Elizabeth, N. J., assignor to Cities Service Oil Company, New York, N. Y., a corporation of Pennsylvania Application October 12, 1940, Serial No. 360,861

1 Claim. (Cl. 23—255)

This invention relates to gas analyzing apparatus, and more particularly to improvements in apparatus for making quantitative determination of the active components of a gas mixture.

Methods are known for measuring combustible components of gas mixtures according to which a stream of the gas mixture is passed through a combustion zone and any temperature increase occasioned by combustion is indicated as a measure of the combustible components of the mixture. In general, the apparatus required for practicing such methods is bulky and incorporates electric motors or other elements which require for their operation an external source of electric current.

A primary object of the present invention is to provide gas analyzing apparatus which is portable, and the operation of which is not dependent upon an external source of electric power.

In the operation of any quantitative gas analyzer of the general class referred to it is desirable to at all times maintain a uniform flow of the gas mixture under test through a combustion zone and over any catalytic surface within said zone. This is because variations in the gas flow rate have important adverse effects on the accuracy of any operating temperature measurements made during calibration and during a gas analyzing operation.

Another object of the present invention is therefore to provide means whereby a uniform flow of gas mixture through a combustion gas analyzer is assured irrespective of the means employed for supplying the gas to the analyzing unit.

The invention is directed generally to apparatus for analyzing gas mixtures quantitatively for one or more combustion components. In other words the apparatus is designed for use in measuring the amount of combustible gas which is present for example in mine atmospheres or in automotive exhaust gases, as well as for measuring the amount of oxygen which is present in the breath expelled from the lungs or in furnace flue gases.

Heretofore some difficulty has been encountered in obtaining accurate and dependable analyses of small amounts of combustion components in gas mixtures by means of apparatus designed on the principle of catalytic combustion and employing a Wheatstone bridge. These difficulties are increased in cases where it is desirable or necessary to operate the catalyst and non-catalyst legs of the bridge at different temperatures or when the heating current for the catalyst fluctuates, or when variations occur in the proportions of water vapor and carbon dioxide or other inert gas in the gas mixture under analysis. Any of these factors may operate to upset calibration of the apparatus during the period in which the analysis is being made.

Another object of this invention is therefore to provide a combustion gas analyzer of the Wheatstone bridge type having a novel arrangement of compensating shunt and series resistances in its electrical circuit whereby the balance of the bridge may be maintained despite small fluctuations in the heating current, small variations in inert content of the gas mixture under analysis, and different optimum operating temperatures for the catalytic and non-catalytic legs of the bridge.

With the above stated objects and other objects and features in view, the invention resides in the improved gas analyzing apparatus which is hereinafter described and more particularly defined by the accompanying claim.

The invention will be described specifically by reference to the accompanying drawing, in which.

Figure 1:
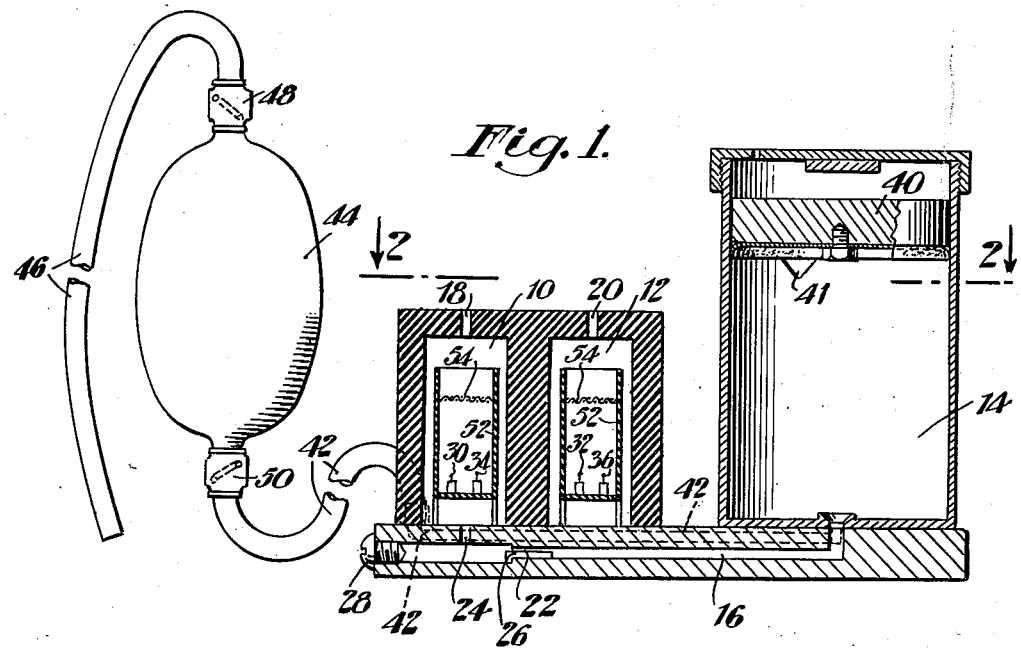
Fig. 1 shows a preferred embodiment of the apparatus in vertical section on the line I—I of Fig. 2, the pump being shown in elevation.

In the drawing numerals 10 and 12 respectively designate similar combustion and comparison cells of a gas analyzer. The lower end of cell 12 is sealed, while the lower end of cell 10 is connected to a gasometer 14 by a conduit 16. Cells 10 and 12 are respectively open at their upper ends to atmosphere through ports 18, 20. A flow restriction orifice 22 is located in conduit 16 at a point between an inlet port 24 at the lower end of cell 10 and gasometer 14. Orifice 22 serves as a flow metering orifice, the size of which is determined by the size of a replaceable orifice pin 26 which can be inserted or removed through an aperture normally closed by removable sealing screw 28.

Figure 3:
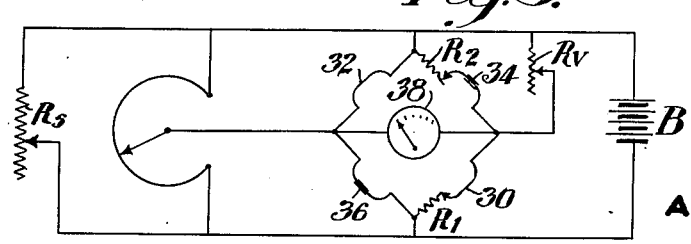
Fig. 3 is a wiring diagram of a preferred electrical circuit for use in the analyzing unit of the apparatus.

Secured within the cells 10, 12, respectively, are corresponding heating elements in the form of filaments 30, 32 of a catalytic metal such as platinum or platinum alloy. A preferred metal for these filaments is platinum coated with barium and cerium oxides. As shown in Fig. 3, these catalyst filaments form the variable legs of a Wheatstone bridge circuit, the latter having therein fixed non-catalytic resistance filaments 34, 36, and a galvanometer 38. The non-catalyst legs 34, 36 are preferably composed of platinum plated with gold.

The gasometer 14 is provided with a floating piston 40 having a periphery which forms a close sliding fit within the upright cylindrical walls of the gasometer so that the piston may reciprocate therein to form a variable volume gas storage chamber from which gas is delivered at a constant rate to combustion cell 10. An aperture 41 is cut into the wall of the gasometer 14 at a point adjacent the top thereof through which excess gas may escape to atmosphere when the aperture is uncovered by upward movement of the piston, thereby limiting such upward movement.

In operation, gas to be analyzed is delivered to the gasometer under pressure by a conduit 42 from a pump 44 which is illustrated as a manually operable elastic piston or bulb type of pump. The suction end of pump 44 is adapted to withdraw gas to be analyzed from a source thereof through a suction conduit 46 into the pump past a check valve 48. Squeezing the bulb of the pump forces the gas past a check valve 50 through conduit 42 into the gasometer. From the gasometer the gas flows past orifice 22 into the base of cell 10 through port 24. The gas flows upwardly through cell 10 around the outside of a cup-shaped imperforate baffle 52 toward the exit port 18. Filaments 30 and 34 are mounted inside the cup 52 in the cell 10. A small part of the gas flowing through the cell diffuses downwardly into the interior of the cup baffle 52 through a wire screen 54, and is burned on coming in contact with catalyst filament 30. Comparison cell 12 is fitted with a similar cup 52 and screen 54, but an inert gas or air atmosphere is maintained therein. The galvanometer or millivoltmeter 38 may be calibrated to give a direct reading of the amount of combustible or oxygen in the gas passing through cell 10.

Figure 2:
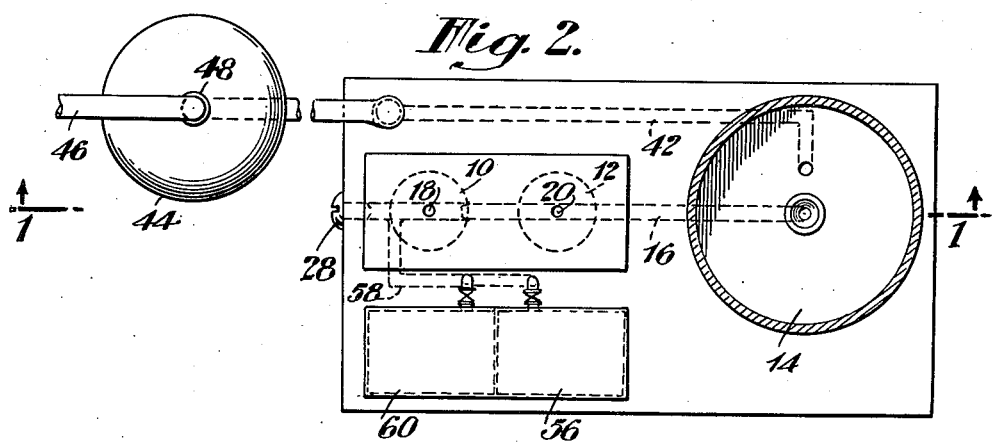
Fig. 2 is a top plan view of the apparatus of Fig. 1.

In case the gas is to be analyzed for oxygen content, hydrogen may be added thereto at a constant rate from a source 56 thereof under pressure, through a valved conduit 58 (Fig. 2). On the other hand if the gas is to be analyzed for combustible content, a source of compressed air or oxygen 60 may be used to supply sufficient oxygen at constant rate to insure complete combustion of any combustible components of the gas.

Calibration of the analyzer is effected by passing air or other gas of known composition through the combustion cell. For example, if the analyzer is to be used for determining the amount of excess oxygen in furnace flue gases, the apparatus is first calibrated by passing through the combustion cell a mixture of pure air together with sufficient hydrogen to burn the oxygen content of the air. The final temperature thus developed in filament 30 by combustion of the air-hydrogen mixture is adjusted to approximately 1600° F. (bright red heat) by means of a variable resistance $R_s$ which is shunted across the heating current supply to the bridge. The total heating current supply is of course held substantially constant, preferably at about 2.4 amperes.

The optimum operating temperature for the catalyst wire is higher than desirable for operating a gold plated non-catalyst wire. Accordingly the wires 30, 34 in the combustion cell are preferably constructed of different diameters in order that the gold plated wire may operate at a lower maximum temperature as compared to the catalyst wire. Resistances $R_1$ and $R_2$ have been shown as respectively connected in series with the catalyst wire 30 and with the non-catalyst wire 34 to make it possible to balance the bridge despite variations in the relative conductivities of the wires 30 and 34.

During the period of analysis some variation may occur in the current supply to the bridge, when such current supply comes from a battery B or from an outside A. C. line through a rectifier and amperite. By simultaneous adjustment of resistances $R_1$ and $R_2$ the bridge may be held in balance and a point may be found where the bridge will remain in balance even when the current supply varies as much as 5%. It will be understood that by adjusting resistances $R_1$ and $R_2$ alteration is effected in the relative current flow through the bridge circuits 32, 36 and $R_1$, 30, 34 $R_2$. Resistance $R_s$ is of course changed if necessary to keep the maximum calibration temperature of wire 30 at approximately 1600° F.

Another factor which has to be considered in calibrating the analyzer for measuring excess oxygen in a gas sample is variations which may occur in the amount of water vapor and carbon dioxide or other inert gas in the gas mixture under analysis. In this connection it will be understood that excess hydrogen added to the gas for analysis is the equivalent of an inert gas insofar as concerns its effect on the instrument calibration. The thermal effects of these variations in inert gas content of a gas may be compensated for by adjusting the relative lengths of filaments 30 and 34 so that the thermal effect of these inert gases on wire 34 is slightly greater than on wire 30. A variable resistance shunt $R_v$ is then included in the bridge circuit across wire 34 and $R_2$, by means of which the relative temperatures of wires 30 and 34 may be adjusted during calibration. Shunt resistance $R_v$ affords the means for accurately equalizing the thermal effects of inert components of the gas under analysis on wires 30 and 34, thereby insuring accurate analyses of combustion content despite small variations in the amounts of carbon dioxide or water vapor and excess hydrogen in the gas stream flowing through the combustion cell.

The invention having been thus described in its preferred form, what is claimed as new is:

In a gas analyzer, a combustion cell and a comparison cell, a Wheatstone bridge electric circuit having two catalyst wire legs and two non-catalyst wire legs, a catalyst wire and a non catalyst wire being mounted in each cell, means for supplying heating current to the legs of the Wheatstone bridge, means for passing a stream of gas to be analyzed at a uniform rate through the combustion cell, a millivoltmeter shunted across the bridge for measuring bridge unbalance, and means for adjusting the balance of the bridge comprising a variable resistance shunted across the heating current supply, adjustable resistances connected in series respectively with the catalyst and non-catalyst legs in the combustion cell, and a variable resistance connected in shunt with the non-catalyst leg in the combustion cell.

ALAN P. SULLIVAN.